United States Patent
Hommersom et al.

[11] Patent Number: 6,134,565
[45] Date of Patent: *Oct. 17, 2000

[54] APPARATUS AND METHOD FOR EXTRACTING OPERATOR SELECTED ARTICLES FROM A PLURALITY OF ARTICLES WITHIN AN IMAGE OF A DOCUMENT

[75] Inventors: Frederik Johan Hommersom, Venlo; Karen Janine Hanse, Nieuwegein, both of Netherlands

[73] Assignee: Oce-Nederland B.V., Ma Venlo, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/671,637

[22] Filed: Jun. 28, 1996

[30] Foreign Application Priority Data

Jun. 30, 1995 [NL] Netherlands ............ 1000701

[51] Int. Cl.$^7$ ...................................... G06F 7/00
[52] U.S. Cl. ............................. 707/517; 707/530
[58] Field of Search ..................... 707/517, 518, 707/520, 525, 530, 539–40; 382/176, 180

[56] References Cited

U.S. PATENT DOCUMENTS

| | | | |
|---|---|---|---|
| 4,907,285 | 3/1990 | Nakano et al. | 382/176 |
| 5,185,813 | 2/1993 | Tsujimoto | 382/180 |

OTHER PUBLICATIONS

Tsujimoto et al., "Understanding Multi–articled Documents", *10th International Conference on Pattern Recognition*, 1990, pp. 551–556.

*Primary Examiner*—Stephen S. Hong

[57] ABSTRACT

A device for identifying at least one article within an image of a document, the document including plural articles, with each article including one or more objects. The device performs a first step in which the image is analyzed as to its layout to distinguish text blocks, titles, photographs and graphic elements. In a second step, the device assembles objects into groups by successive application of rules concerning their type and their mutual positioning. The image is displayed on a screen and an operator can select an article, can have the objects automatically re-arranged by the device in a form specified by him, and can have the article printed separately from the other articles in the document.

34 Claims, 5 Drawing Sheets

APPARATUS AND METHOD FOR EXTRACTING OPERATOR SELECTED ARTICLES FROM A PLURALITY OF ARTICLES WITHIN AN IMAGE OF A DOCUMENT

FIELD OF THE INVENTION

The invention relates to a method and apparatus for extracting articles from a document.

BACKGROUND OF THE INVENTION

An example of an article-extracting apparatus is European Patent Application Publication No. 0629078, published Dec. 14, 1994, which claims priority based upon Dutch application 9301004, filed Jun. 11, 1993, and which is related to copending U.S. patent application Ser. No. 08/257,921, filed Jun. 10, 1994 because the copending U.S. application also claims priority based upon the Dutch application 9301004. This apparatus includes a scanner for scanning a document and generating digital image data corresponding to the image on the document, and a processing unit for analyzing image data in order to determine the document layout. During this analysis, the image is segmented into lay-out elements, referred to as objects, such as text blocks, photographs and graphic elements. The image is then displayed on a video display unit (VDU), whereupon an operator arbitrarily can select an object and move it to a receiving image separately from the rest of the image, by a cut and paste method, known from word processing.

One example of a composite document image is illustrated in FIG. 1, which is a newspaper page on which a number of objects of different type (only three types in this case for the sake of simplicity, i.e., title, text block and photograph) are displayed with their outline. The objects illustrated are associated with one another in groups: the articles. FIG. 1 shows an article by hatching.

When making up a newspaper page, the various objects are so placed with respect to one another and separated from one another by auxiliary elements, such as lines, that a reader can easily determine which objects belong to an article. The rules applied in making up the page often differ for each newspaper, although there appears to be a number of universal rules.

There is sometimes a need to gather articles relating to specific subjects from a set of documents, such as newspapers, and present them separately. This is frequently effected by cutting out the relevant articles and sticking them together on separate sheets of paper. The result might be termed newspaper cuttings. Making up newspaper cuttings is a time-consuming activity and it is often a tedious task to adapt the clippings, which still have the form in which they were printed in the source document, i.e., the document from which the article has been cut, to the shape of the receiving sheet, the page bearing the newspaper cuttings.

With the known apparatus it is possible to separate an article from the rest of the document and output it separately, e.g., to a printer. In the case of an article made up of a large number of objects, however, this is also a time-consuming activity, because each object must be separately selected (by the operator) and output. There is therefore a need for apparatus which enables an operator to select and output an article in one operation.

SUMMARY OF THE INVENTION

An apparatus which enables an operator to select and output an article in one operation is provided by the present invention as embodied in an apparatus for identifying at least one article within an image of a document, the document including a plurality of articles, the apparatus comprising: means for inputting an image of a document, the document including a plurality of articles; segmentation means for automatically segmenting the image into constituent elementary objects; and distinguishing means for automatically distinguishing, amongst the objects of the image, at least one group of associated objects to define an article.

In one embodiment of the apparatus, the means for distinguishing an article means for determining the mutual positional relationships of the objects of said image and differentiating them on the basis of a predetermined set of rules concerning positional relationships.

In another embodiment of the apparatus according to the invention, the processing unit is adapted, when segmenting an image into objects, to classify said objects by type and the means for distinguishing an article includes means for determining the mutual positional relationships of the objects of the image and distinguishing them on the basis of a predetermined set of rules concerning the types and the said positional relationships of the objects.

The differentiation process is therefore a knowledge-controlled process based on rules concerning the positional relationships, i.e., of the layout, of a source document. These rules are taken from experience and may differ for each document, at least partially.

In a further embodiment, the apparatus is provided with means whereby an article can be brought into a different form by rearranging its objects, the read sequence being maintained, i.e., the sequence in which the different objects of an article must be read in order to be coherent to the reader. In this way, an article (frequently accommodated capriciously in the source document so that it can be fitted in between other articles) can be brought into a form adapted to a predetermined output/presentation medium. This will generally be a rectangular shape.

The invention also relates to a method embodied by the apparatus according to the invention.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention and wherein . . .

DETAILED DESCRIPTION OF THE PREFERRED EMBODIMENTS

The term, newspaper, is used throughout the following description but it is to be understood as meaning any other document having a composite image.

Figure 1:
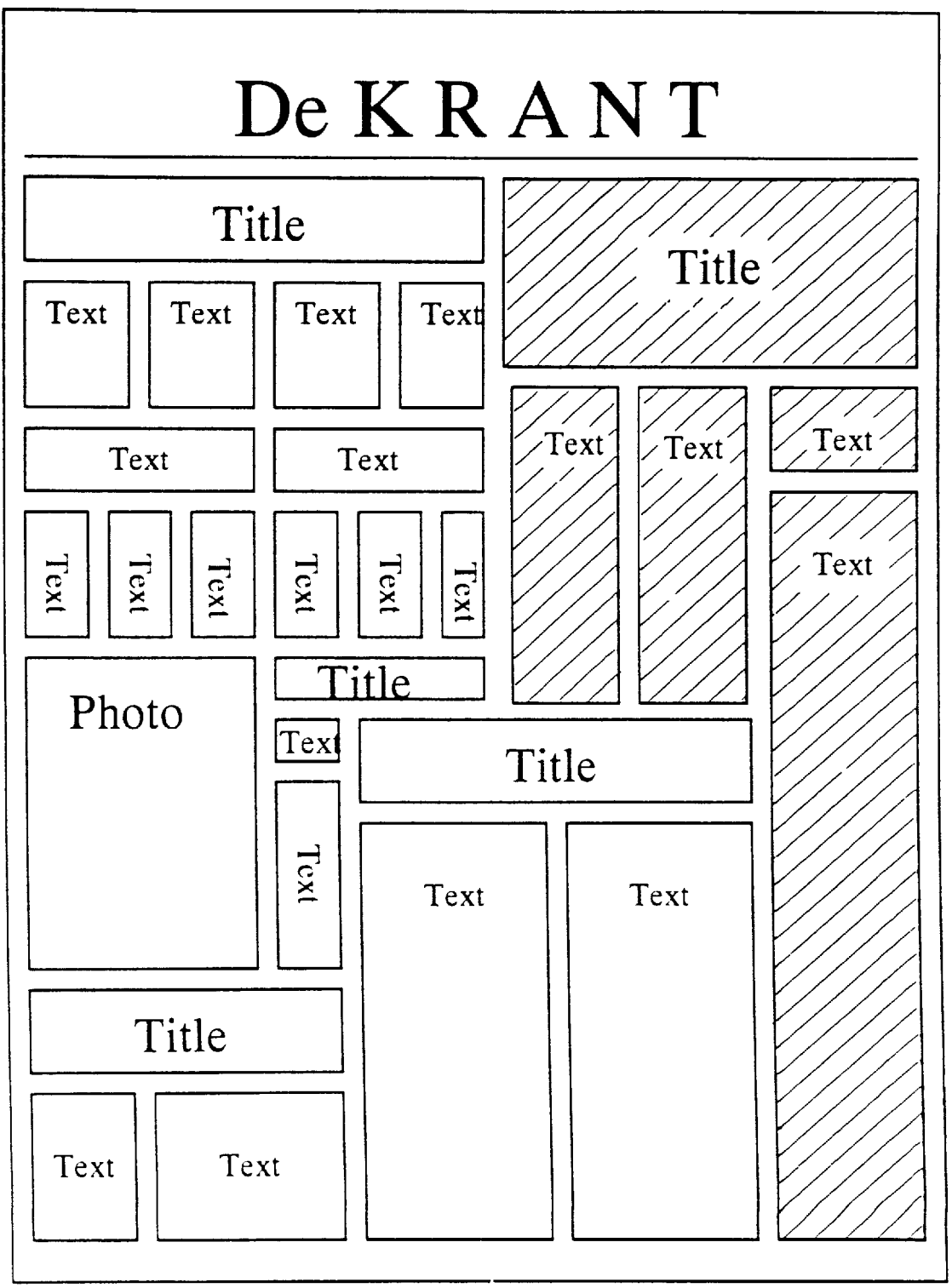
FIG. 1 is an example of a source document comprising a composite image, e.g., a newspaper page.
Figure 2:
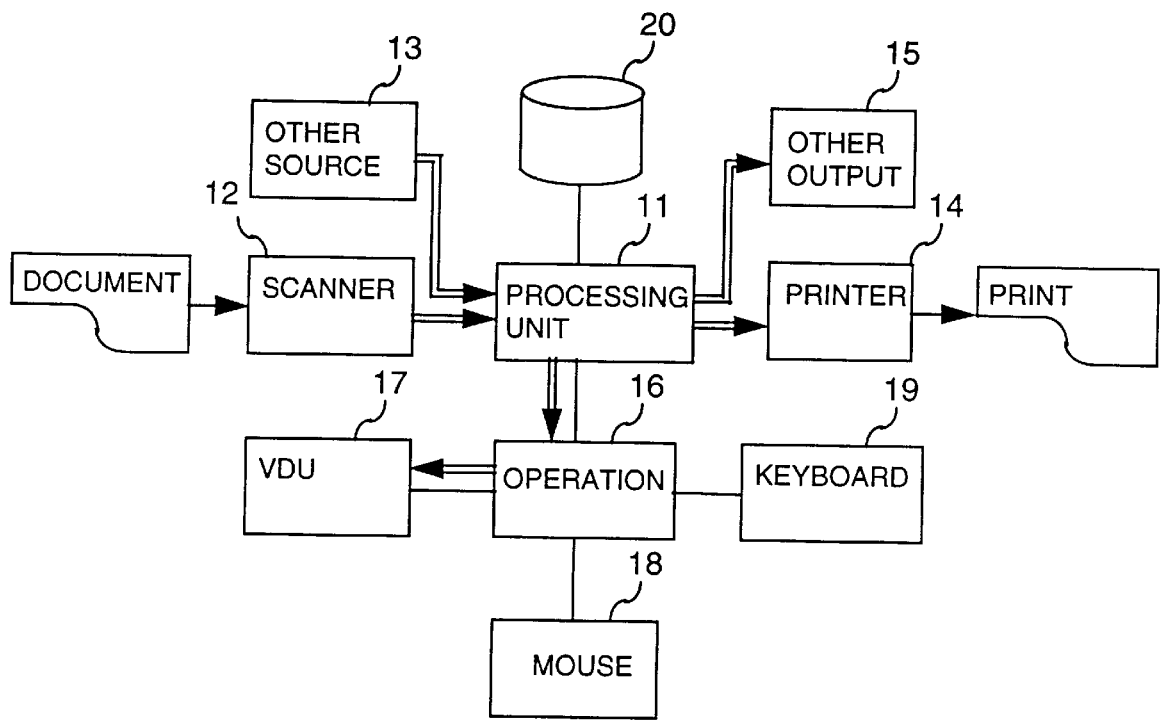
FIG. 2 is a diagrammatic illustration of the construction of an apparatus according to the invention.

FIG. 2 illustrates an apparatus according to the invention suitable for recognizing separate articles in a source document (including a composite image such as a newspaper page), presenting said articles differently, and outputting them separately, e.g., as a print on paper, in response to an operator's command. This apparatus includes a central processing unit 11 connected to a scanner 12, another (optional) source of digital image data 13, a printer 14, another (optional) output of processed image data, a memory disc 20, and an operating unit 16. The latter is also connected to a VDU 17 and operating means, such as a mouse 18 and a keyboard 19.

The scanner 12 is an opto-electrical scanner which scans a document line by line and produces digital image data in the form of the grey values of image elements or pixels in a raster. The scanner has a resolution of 300 dots per inch (dpi), which is ample to reproduce a text image or screened photograph sharply. The other source of digital image data 13 is, for example, a mass memory or a network connection.

The central processing unit 11 is, for example, a computer having a program suitable for the same, but may also include hardware adapted to the application, partially if required. The processing unit 11 comprises different modules for processing digital image data.

The operating unit 16 is adapted to give an operator opportunities of operating the apparatus and, if necessary, correcting results of the processing. To this end, graphic operating elements are displayed on the screen 17 and can be operated by way of the mouse 18 (or any other well known point-and-select device). In addition, the VDU 17 is used to show an image, a partial image if required, of the source document for the purpose of article selection.

Finally, the printer 14 is a normal printer adapted to print the image data with the required resolution. The other output 15 can be a mass memory or a network connection.

Figure 3A:
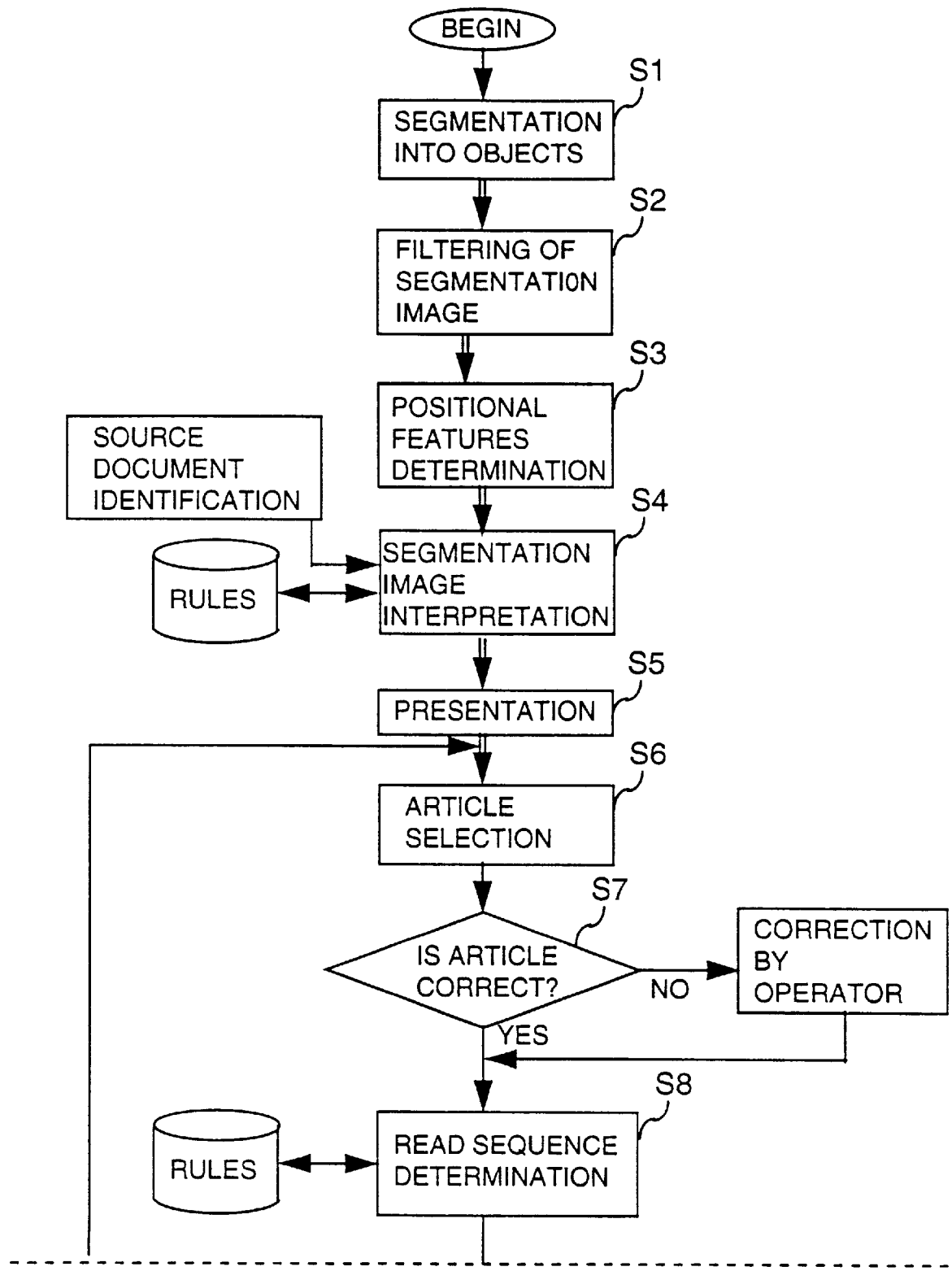
FIG. 3 (formed by FIG. 3A and FIG. 3B) is a flow diagram of the method according to the invention.
Figure 3B:
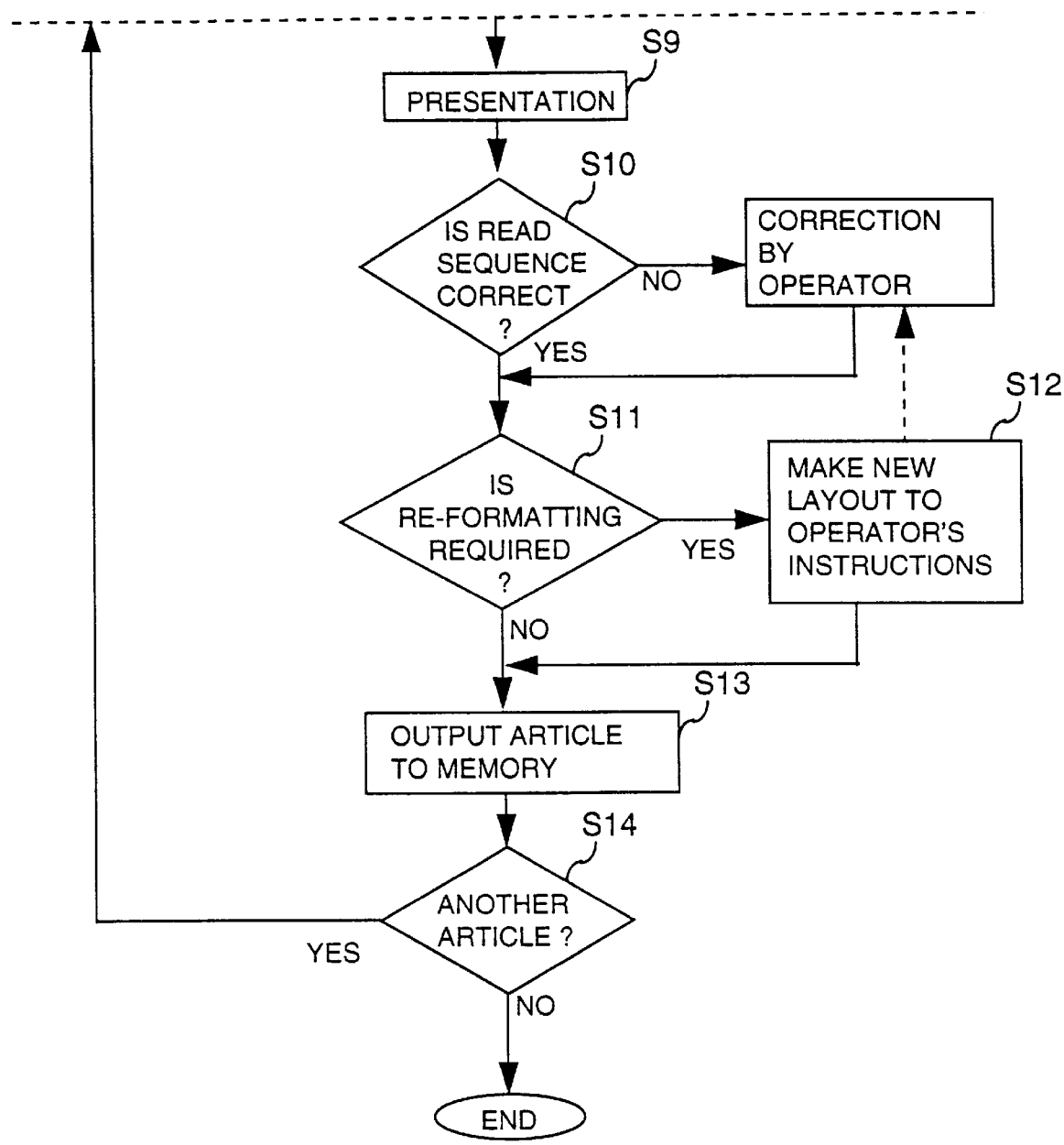

The processing of image data corresponding to a source document, such as a newspaper page, as carried out by the processing unit 11, will now be explained with reference to FIG. 3.

Briefly, the processing includes segmenting the image into parts, referred to as objects, collecting objects which belong to an article, and presenting the result to the operator. The latter can then select an article and separate it from the rest. On command, the article layout can then be changed (re-formatting). For this purpose, the sequence of the objects (the read sequence) is first determined in respect of the separated article, so that this sequence can be retained in the re-formatting. The separated article can then be printed by the printer.

In step S1, the image is segmented into objects. Processing of this kind includes two steps. In a first step, clusters of adjoining information-carrying pixels are sought in the image, and are characterized as character, line, graphic or photo and managed. In addition, characters larger than the average size of the characters are characterized further as large. In the second step, the image information of the character type is divided up in an iterative process into text blocks, lines and words. As an example of a detailed implementation of step S1, see copending U.S. patent application Ser. No. 08/257,921, filed Jun. 10, 1994, which is hereby incorporated by reference. For the purpose of the invention described here, the segmentation result is expanded with the objects title (a text block or line formed of large characters) and horizontal line and vertical line (determined from the ratio of the horizontal and vertical dimensions). In addition, the average width of the text blocks is calculated, whereafter the objects title and horizontal line are characterized further in greater detail as being wide (wider than the said width) or narrow (no wider than the said width).

All the objects in the image are now known and named, and their positions are fixed in the form of coordinates, e.g., from the top left-hand corner and the bottom right-hand corner of each object. The result is referred to hereinafter as the segmentation image. In addition to this segmentation image, the original image is also stored in the memory for display on the screen.

In step S2 the segmentation result from step S1 is filtered so that only the objects of the types text block, title, photo, graphic, horizontal line and vertical line are retained. Also, objects within a photograph are removed.

Step S3 comprises determining qualitative position features for all the remaining objects. This means that the bottom, top, left-hand and right-hand neighboring objects are determined for each object by reference to the co-ordinates. These mutual position relationships are stored in a memory for each object.

The actual analysis of the segmentation image takes place in step S4. This is carried out by way of an interpreter with reference to a number of rules based on the conventional lay-out of the document being processed. A set of such rules for different documents is stored in the memory 20 and the interpreter calls up from the memory the set of rules for the newspaper from which the source document forming the basis of the segmentation image originates. The rules stored in memory 20 need not all apply to the source document for processing. In addition to the set of rules, a list is therefore stored in the memory 20 including for a number of newspapers the rules applicable to that particular newspaper. The name of the newspaper is supplied to the interpreter by the operator using the operating unit 16. From the said list the interpreter knows what rules are to be called up. If the origin of the page is not known or if there is no set of rules for the source in question, a default set of rules of a general type is brought up.

The rules of the loaded set are then applied one by one to the segmentation image resulting from step 3. The effect of this application of rules is that the objects from the segmentation image which, on initialization, are each regarded as an article, are successively added together to form groups. These groups represent the actual articles of the source document.

A more detailed explanation of the operation of the interpreter is indicated hereinafter.

After the analysis is completed, the source document is displayed on the VDU 17 (step S5) and the operator can select an article with the mouse 18 (step S6). The general part of the process is now complete and the description will now discuss a selected article.

For selection, the operator can click on any object of an article by way of the mouse; this is then automatically converted into a selection of the entire article. The selected article is displayed on the screen with a grey or colored background so that the user can check whether the result of interpretation is correct. Operating elements for adapting the analysis result are then displayed on the screen 17. With these the user (in step S7) can remove objects from the article or add other objects, simply by clicking them with the mouse and giving a command intended for the purpose.

The operator can now give a command for separating the selected article, either after correcting the analysis result or not, in the form of a cut-and-paste operation, the article being shifted to a separate screen window. Step S7 is completed by erasing the segmentation image from the screen and displaying the separate window.

A second interpreter is then called in step 8 and again, by reference to rules, the interpreter determines the sequence of the objects of the selected article (the read sequence). It has been found that this analysis can be carried out with a limited number of rules valid for all (western) newspapers. Some examples of rules are as follows:

a) If an article (group of objects) contains one object of the title type, that object has read sequence position 1.

b) If a text block is situated immediately at the top left beneath an object having read sequence position n, then this object has read sequence position n+1.

c) If a text block is situated immediately on the right and at the top next to a column of text blocks having as highest position k, that object has read sequence position k+1.

The result of this analysis is then stored (step S9) in the memory and can, on a command for the purpose from the operator, be displayed on the screen 17 in combination with the image of the selected article, e.g., by displaying across the image a number which indicates the read sequence.

The operator then has the opportunity of changing the read sequence (step 10) by clicking and re-numbering specific objects. The selected article is now ready in principle for being output separately to the printer 14 (or some other output 15), but it may be that the form of the article which is still the same as that in the source document requires to be changed (re-formatting). The operator can take action for this purpose (in step S11) and change the form by way of operating elements offered for the purpose on the screen 17.

If the re-formatting (step S12) shows that the read sequence is incorrect, then it is possible to return to step S10. Re-formatting is discussed in greater detail hereinafter.

After re-formatting (S12), the image information of the processed article can be output to a memory in step S13, whereafter it is possible to return to step S6 in step 14 for selection of another article from the source document.

The image information can be transmitted from the memory to the printer 14 or other output 15.

The operation of the interpreter in step 4 in FIG. 3 will now be described.

After the interpreter has called up from the memory 20 the set of rules associated with the source document, it processes it rule by rule in the given sequence, each rule being applied to all the objects of the source document.

Initially, all the objects are designated as an article and are given an identification number in accordance with an arbitrary scheme. The operation of the interpreter is now intended to combine objects into groups by applying the rules successively. In these conditions all the objects are analyzed consecutively, each (first) object being systematically tested in respect of its relationship with all the other (second) objects by reference to the rule applied. If the outcome of the test is positive, the second object is added/attached to, i.e., associated with, the first. An object added to another object in this way is given the identification number of said other object, and loses its own identification number, but is retained as an individual so that the rules can still be applied to it.

A rule has as a general form: 1) a requirement relating to the type of the (first) object, 2) a requirement relating to the type of the other (second) object, 3) a requirement relating to the positional relationship between the two objects, and 4) a decision to add when the requirements 1, 2 and 3 are met. A rule may also have different sets of requirements 1), 2), 3);

in that case the action in 4) is carried out only if all said sets of requirements are satisfied.

The application of the rules by the interpreter is carried out on the backtracking principle. A check is first made for a first object whether it is of the type required by the rule. If so, a check is successively made for each other (second) object whether said other object is also of the type required by the rule. For each other (second) object for which this is the case, a check is made for the combination of the first and the associated other (second) object whether the condition in respect of the mutual positions is satisfied. If so, and if the rule includes references to even more objects, then a test is carried out for all the combinations of the first and second object with third objects whether the type of the third object satisfies the rule or whether the positional condition is satisfied, and so on. Whenever a combination of objects fully satisfies the rule, the action specified by the rule (addition of an object to another object) is carried out.

The following exemplary rules form a basic set for general use. There are a number of specific i.e., idiosyncratic, rules in addition for each newspaper. Of course the result of the analysis improves with an increasing number of rules, although with the arbitrary addition of new rules there is an increasing risk that objects will incorrectly be added to one another, thus reducing the discrimination effect.

The rules are paraphrased so that it is immediately apparent what their effect is.

R1: Each text block or photograph beneath a title and not separated therefrom by a title or a line is added to said title.

R2: Each text block or photograph situated beneath a photograph and not separated therefrom by a title or line is added to said title.

R3: A photograph having immediately therebeneath first a text block and then a title is added to the title provided a vertical line is situated immediately next to all the said objects.

R4: A text block, photograph or title flanked on both sides by objects belonging to one and the same article is added to said article.

R5: A title having a horizontal line immediately therebeneath is added to a text block situated immediately beneath said line.

R6: A title situated immediately beneath another title is added thereto.

R7: A title having immediately therebeneath a not much wider horizontal line with a second title immediately therebeneath is added to said second title provided there is not also a vertical line beneath the horizontal line.

R8: A narrow title situated immediately beneath a text block in turn situated beneath a wide title is added to said text block.

For a specific simple newspaper, there are in addition the following rules (it should be again mentioned that the sequence of application of the rules is obligatory; accordingly they should be added between the above rules in accordance with their sub-numbering).

R2a: Any text block, title or photograph not yet added to an article and situated beneath a horizontal line and not separated therefrom by a title or a line is added to any adjacent other text block or photograph having the same positional property.

R4a: Any text block not yet added to an article and immediately situated beneath a wide horizontal line and also immediately above a title is added to said title.

R5a: Any text block situated above a horizontal line and not separated therefrom by a title or a line, and also situated beneath a horizontal line or a title and not separated therefrom by a title or a line, is added to any adjacent title, text block or photograph having the same positional properties.

R6a: Any text block situated immediately beneath another text block is added thereto.

R6b: A text block situated immediately beneath a horizontal line which is in turn situated immediately beneath another text block is added to said other text block provided that on the right of the said two text blocks there is a text block or photograph belonging to the same article as said other text block.

R6c: Same as R4.

R8a: Same as R4.

Although the rules R6c and R8a are the same as R4, they are not superfluous, because they are applied at a later time, hence to a different intermediate result.

After all the rules have been applied to all the combinations of objects, the objects are combined into groups corresponding to the articles of the source document.

Re-formatting of a separate article is carried out by a separate module of the processing unit 11.

The following exemplary rules apply to re-formatting:

the read sequence must be maintained;

text must in principle be displayed to true size;

titles and photographs may, if necessary, be reduced to a minimum of 40% of their original format; and text blocks may be split horizontally (i.e., cut between two lines).

Prior to the re-formatting procedure, the available reception space for the article is determined. This is generally the format of the printer paper, but can also be made smaller by the operator using the mouse. In that case, the receiving space on the screen 17 is displayed in the form of a rectangle, whereupon the operator can drag, e.g., the bottom right-hand corner, using the mouse. The receiving space is then set as the rectangle defined by the new bottom right-hand corner and the (unchanged) top left-hand corner.

Once the receiving space has been determined, it is filled with the objects of the article in the read sequence. This is carried out by the re-formatting module as follows:

A check is first made whether titles and photographs (if present) fit in the receiving space. If not, an object of this kind is reduced as much as necessary for it to fit. The reduction is isotropic (equal in the horizontal and vertical directions) and never goes beyond 40% of the original size. If the object still does not fit, an error signal is given and re-formatting stops. The operator can then take the necessary action (e.g., further reduction or removal of the object from the article).

The receiving space is then filled in vertical columns with the article objects. This operation starts with a column bordering the left-hand edge of the receiving space. The objects are placed therein from top to bottom in the read sequence one beneath the other, adjoining the left-hand edge. In these conditions, the bottom edge of the receiving space will be reached or exceeded at a given time. If it is exceeded, and if the exceeding object is a text block, it is split as close as possible to the bottom edge within the receiving space and the remaining part is placed as the first item in the next column.

A check is then made where the following column (looking to the right) can be placed. The left-hand edge selected for this next column is the right-hand edge of the narrowest text block in the previous column plus a predetermined separating distance (white space), and the top boundary selected is the highest point on the left-hand edge just determined and not situated in an object of the previous column. It is possible to skip over a photograph projecting from the previous column (in which case the new column will consist of two separate parts), but not over a text block or title projecting from the preceding column.

Figure 4:
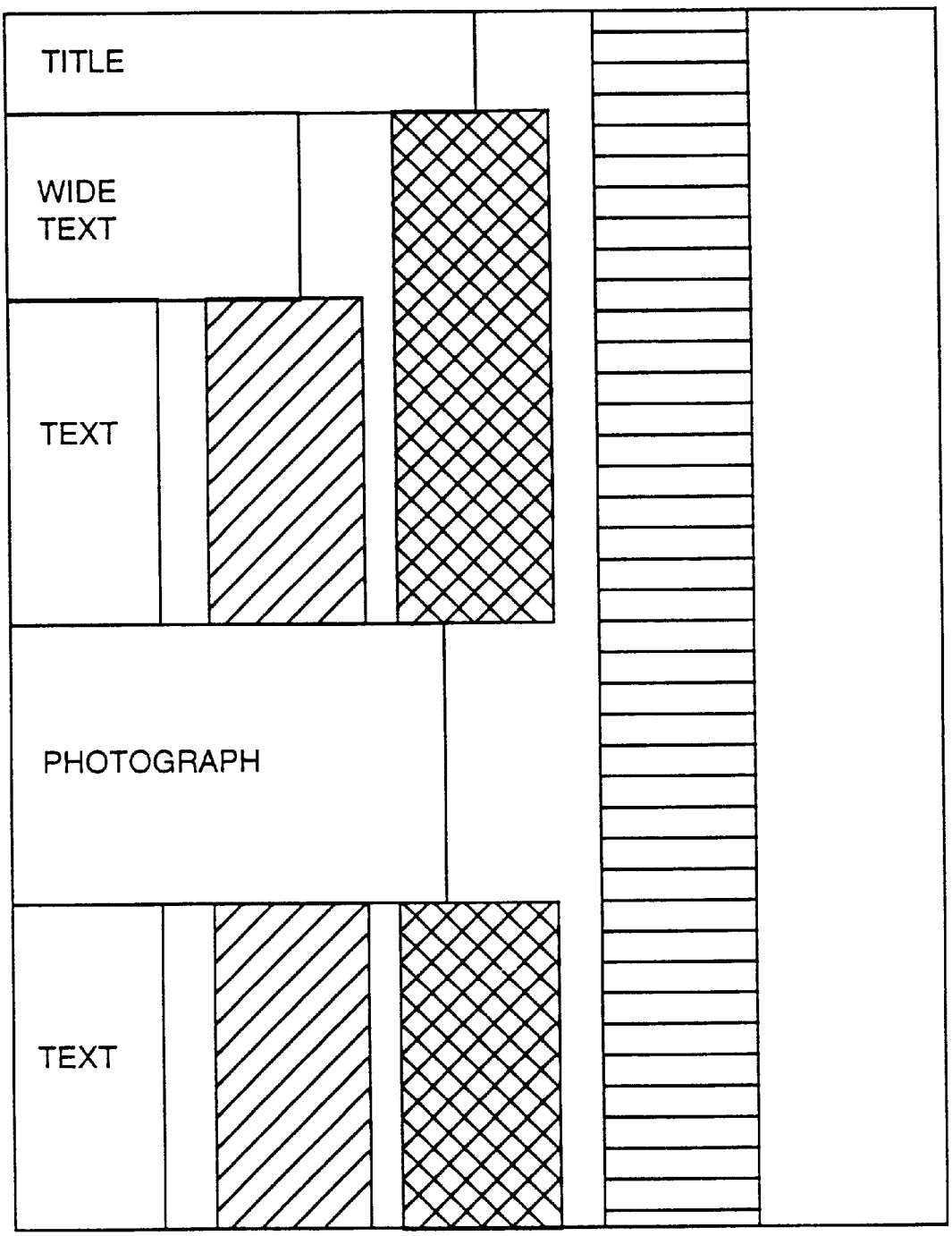
FIG. 4 is an example of an article re-formatted by the apparatus.

The effect of these rules is shown in FIG. 4. Here the frame encloses the receiving space, and the first column, the one furthest on the left, is already filled with objects, reading from top to bottom: a wide title, a wider than average text block, a normal text block, a wide photograph, and again a normal text block. For the sake of simplicity, it is assumed that all the following objects are normal text blocks. According to the rule, the second column, shown with diagonal hatching, is brought up against the normal text blocks of the first column. This second column starts directly beneath the wide text block and skips the photograph. The third column (cross-hatching) is brought up against the second column. Since the wide text column is now no longer in the way, the third column can start directly beneath the title, but the photograph still projects into the space for the third column and has to be skipped. Finally, the fourth column (shown with horizontal hatching) has no obstacles and extends accordingly from the top boundary of the receiving space to the bottom boundary thereof.

In this way, the receiving space is filled with the objects of the article for re-formatting. If it appears that the receiving space is not large enough to contain the entire article, the re-formatting module gives an error signal and stops its work. The operator can now enlarge the receiving space in accordance with the above-described method or split the article into parts with a cut and paste command (known from word processing) and re-format these parts separately.

If the operator is not satisfied with the result of the re-formatting, he can re-specify a receiving space with different dimensions and repeat the re-formatting. If the result meets his requirements, the operator can add a text string to the image to specify the origin of the article and then give a command for the article to be printed in the printer, or for the image data thereof to be output via output 15. Different (re-formatted) articles can also be combined for printing together on a receiving sheet. Here again the image operations customary in word processing, such as cut and paste, and drag can be used.

Although the invention has been explained by reference to the above-described exemplified embodiment, it is not restricted thereto. The scope of protection is determined by the scope of the claims and covers all variants possible within that scope.

What is claimed is:

1. A method, for selecting at least one of a plurality of articles within an image of a document, comprising:

receiving an image of a document;

automatically segmenting said image into elementary objects;

automatically grouping said elementary objects into non-read-sequenced articles;

presenting said image having said non-read-sequenced articles to said operator;

receiving a selection of at least one of said non-read-sequenced articles by said operator; and automatically determining a read sequence of the at least one selected non-read-sequenced article to produce at least one read-sequenced article.

2. The method of claim 1, wherein each of said elementary objects is analyzed at least in terms of a positional relationship relative to another one of said elementary objects.

3. The method of claim 2, wherein every possible combination of two of said elementary objects is analyzed at least in terms of a positional relationship therebetween.

4. The method according to claim 1, wherein the step of automatically grouping includes:
initially categorizing each elementary object as one of said non-read-sequenced articles via said analyzing.

5. The method according to claim 1, further including:
enabling said operator to select an entire non-read-sequenced article using a point-and-select device to point to a portion of any one of the elementary objects included therein.

6. The method according to claim 1, further including:
exporting, to an output device, at least one article corresponding to said selection, separately from the rest of the image.

7. The method according to claim 1, wherein elementary objects in a non-read-sequenced article have initial placements relative to one another;
the method further comprising:
automatically rearranging the initial placements of elementary objects in a read-sequenced article while preserving the read sequence.

8. The method according to claim 7, wherein the step of automatically rearranging responds to an operator's specification for the rearrangement.

9. The method according to claim 7, wherein the step of rearranging:
stacks elementary objects vertically.

10. The method according to claim 7, wherein the step of rearranging:
divides an elementary object into parts; and
places the parts at different positions, respectively.

11. The method according to claim 1, wherein:
an elementary object corresponds to one of a text block, a title, a photograph, and a graphic element.

12. An apparatus, for selecting at least one of a plurality of articles within an image of a document, comprising:
a receiving unit to receive an image of a document;
a segmentation unit to automatically segment said image into elementary objects;
a grouping unit to automatically group said elementary objects into non-read-sequenced articles;
an interface unit to present said image having said non-read-sequenced articles to an operator and to receive a selection of at least one of said non-read-sequenced articles by said operator; and
a sequencing unit to automatically determine a read sequence of the at least one selected non-read-sequenced article to produce at least one read-sequenced article.

13. The apparatus of claim 12, wherein said segmentation unit is operable to analyze each of said elementary objects in terms of a positional relationship relative to another one of said elementary objects.

14. The apparatus of claim 13, wherein said segmentation unit is operable to analyze every possible combination of two of said elementary objects in terms of a positional relationship therebetween.

15. The apparatus according to claim 12, wherein said grouping unit is operable to initially categorize each elementary object as one of said non-read-sequenced articles via said analyzing.

16. The apparatus according to claim 12, wherein said interface unit is operable to enable said operator to select an entire non-read-sequenced article using a point-and-select device to point to a portion of any one of the elementary objects included therein.

17. The apparatus according to claim 12, further including:
an export unit to export, to an output device, at least one article corresponding to said selection, separately from the rest of the image.

18. The apparatus according to claim 12, wherein elementary objects in a non-read-sequenced article have initial placements relative to one another;
the apparatus further comprising:
a rearrangement unit to automatically rearrange the initial placements of elementary objects in a read-sequenced article while preserving the read sequence.

19. The apparatus according to claim 18, wherein the rearrangement unit responds to an operator's specification for the rearrangement.

20. The apparatus according to claim 18, wherein the rearrangement unit:
stacks elementary objects vertically.

21. The apparatus according to claim 18, wherein the rearrangement unit:
divides an elementary object into parts; and
places the parts at different positions, respectively.

22. The apparatus according to claim 12, wherein:
an elementary object corresponds to one of a text block, a title, a photograph, and a graphic element.

23. A computer program embodied on a computer-readable medium, for selecting at least one of a plurality of articles within an image of a document, comprising:
a receiving code segment to receive an image of a document;
a segmentation code segment to automatically segment said image into elementary objects;
a grouping code segment to automatically group said elementary objects into non-read-sequenced articles;
an interface code segment to present said image having said non-read-sequenced articles to an operator and to receive a selection of at least one of said non-read-sequenced articles by said operator; and
a sequencing code segment to automatically determine a read sequence of the at least one selected non-read-sequenced article to produce at least one read-sequenced article.

24. The computer-readable-medium-embodied program of claim 23, wherein said interface code segment is operable to present said at least one read-sequenced article separately from said image.

25. The computer-readable-medium-embodied program according to claim 23, further including:
an export code segment to export, to an output device, at least one article corresponding to said selection, separately from the rest of the image.

26. The computer-readable-medium-embodied program of claim 23, wherein said segmentation code segment is operable to analyze each of said elementary objects at least in terms of a positional relationship relative to another one of said elementary objects.

27. The computer-readable-medium-embodied program of claim 26, wherein said segmentation code segment is operable to analyze every possible combination of two of said elementary objects at least in terms of a positional relationship therebetween.

28. The computer-readable-medium-embodied program according to claim 23, wherein said grouping code segment is operable to initially categorize each elementary object as one of said non-read-sequenced articles via said analyzing.

29. The computer-readable-medium-embodied program according to claim 23, wherein said interface code segment is operable to enable said operator to select an entire non-read-sequenced article using a point-and-select device to point to a portion of any one of the elementary objects included therein.

30. The computer-readable-medium-embodied program according to claim 23, wherein elementary objects in a non-read-sequenced article have initial placements relative to one another;

the computer-readable-medium-embodied program further comprising:

a rearrangement code segment to automatically rearrange the initial placements of elementary objects in a read-sequenced article while preserving the read sequence.

31. The computer-readable-medium-embodied program according to claim 30, wherein the rearrangement code segment responds to an operator's specification for the rearrangement.

32. The computer-readable-medium-embodied program according to claim 30, wherein the rearrangement code segment:

stacks elementary objects vertically.

33. The computer-readable-medium-embodied program according to claim 30, wherein the rearrangement code segment:

divides an elementary object into parts; and places the parts at different positions, respectively.

34. The computer-readable-medium-embodied program according to claim 23, wherein:

an elementary object corresponds to one of a text block, a title, a photograph, and a graphic element.

* * * * *